J. BILLINGS.
AUTOMOBILE PLATE AND HOLDER.
APPLICATION FILED JULY 8, 1920.
1,379,438. Patented May 24, 1921.
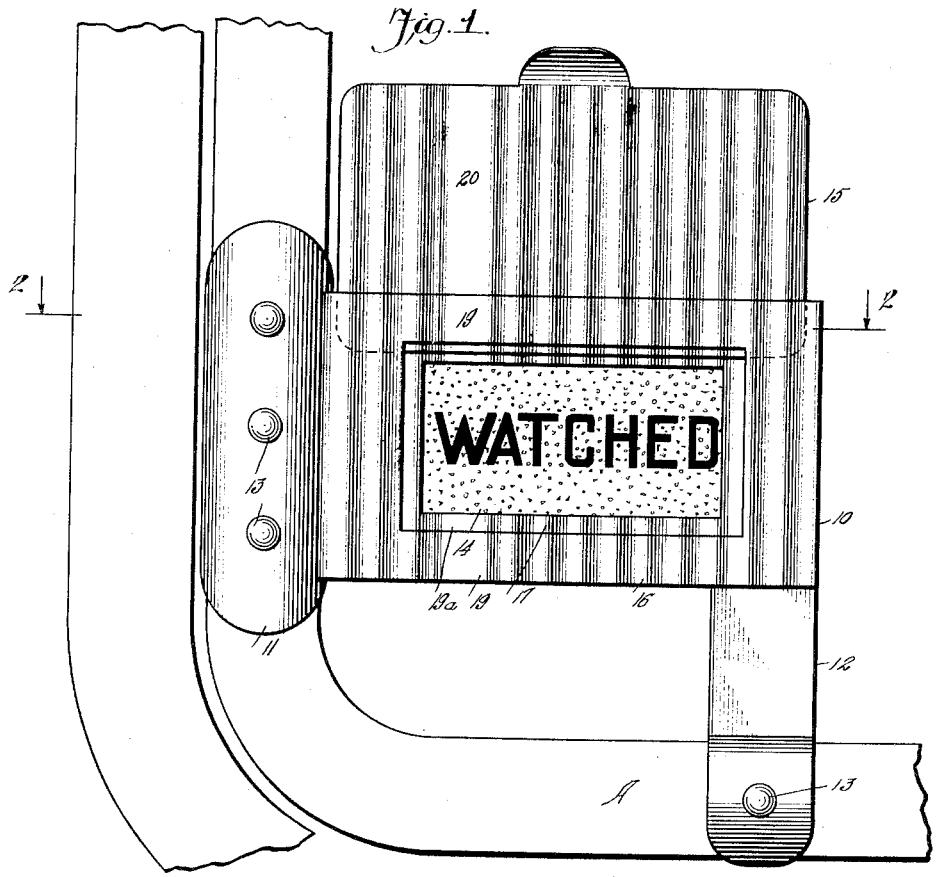
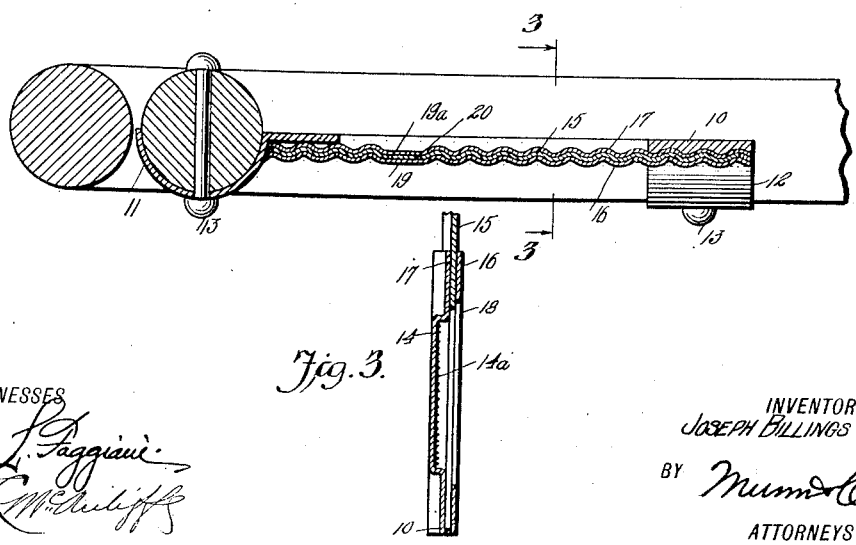
WITNESSES
INVENTOR
JOSEPH BILLINGS
BY
ATTORNEYS

UNITED STATES PATENT OFFICE.

JOSEPH BILLINGS, OF BROOKLYN, NEW YORK.

AUTOMOBILE-PLATE AND HOLDER.

1,379,438.   Specification of Letters Patent.   Patented May 24, 1921.

Application filed July 8, 1920. Serial No. 394,690.

*To all whom it may concern:*

Be it known that I, JOSEPH BILLINGS, a citizen of the United States, and a resident of the city of New York, borough of Brooklyn, in the county of Kings and State of New York, have invented a new and Improved Automobile-Plate and Holder, of which the following is a description.

My invention relates to an attachment in the nature of a "stop thief" device, for use on an automobile or other vehicle, and designed to deter theft or unauthorized use of the vehicle. The device has suitable means to attach it to a wind shield or other conspicuous part of the vehicle, and is so arranged that upon the owner of the vehicle leaving the same the device may be displayed prominently in a manner indicating to the police or others that any use of the vehicle is unauthorized. The indicating means may advantageously take the form of a legend such as "Watched" for example, to thereby have a deterring effect on thieves or others intending to appropriate the vehicle. A cover for concealing the legend or other matter to be displayed is provided and said cover and the holder have mating members so arranged that when the cover is removed no ordinary card, plate or the like expedient can be used to conceal the legend for cloaking a surreptitious use of the vehicle. The mating members of the holder and cover are individualized in practice so that the cover of a particular holder may not be wrongfully used to conceal the legend on another holder.

The nature of the invention will more clearly appear from the specific description following.

Reference is to be had to the accompanying drawings forming a part of this specification, it being understood that the drawings are merely illustrative of one example of the invention.

Figure 1 is a front elevation of an attachment embodying my invention, showing the same mounted on a wind shield frame and with the cover raised in the interest of clearness for showing the warning plate;

Fig. 2 is a horizontal section on the line 2—2, Fig. 1;

Fig. 3 is a transverse vertical section on the line 3—3, Fig. 2, a part of the cover being broken away.

In carrying out my invention in accordance with the illustrated example, a holder designated generally by the numeral 10 is provided having attaching means here shown as consisting of a vertical side member 11 at one end and a depending supporting bracket 12 at the opposite end, said end member and bracket being formed in this instance to conform generally to the surface of a wind shield frame A to which the device may be secured by rivets 13 or other suitable fastening means. The body 10 includes an indicating or warning plate 14, which in practice bears a suitable legend or symbol, the word "Watched" or a like warning being preferably employed in practice. Said indicating plate may be formed integral with the holder 10. A cover plate 15 is employed which is accommodated between a front plate 16 and a back plate 17 of the holder 10, said plates presenting at the top a slot for the cover 15. The indicating plate 14 is here shown as integral with the back plate 17 and as depressed or offset from the general plane of the plate 17 to afford ample clearance for the cover 15 and prevent rubbing of the indicating plate by the cover in the sliding of the latter. The front plate 16 presents an opening 18 through which the plate 14 is visible.

The front and back plates are given a form in horizontal section to present a sinuous or other irregular space for the cover 15 and said cover is given a corresponding form in horizontal section, the general purpose being to prevent a flat card or like flat plate from being inserted in the holder by unauthorized parties for covering the indicating plate 14. To provide the sinuous or irregular space the holder is illustrated as having vertical corrugations, the members of the front and back plates 16, 17 extending beyond a horizontal straight line and the cover is shown as correspondingly corrugated.

With the described construction the cover 15 will be removed by the owner of the vehicle, thereby exposing the word "Watched" or other indicating matter. The mating members of the holder 10 and cover 15 are varied in practice to individualize each holder and its cover. For example, in the present case the regularity of the corrugations of the holder 10 is interrupted by comparatively flat areas or panels 19$^a$, there being a corresponding panel or area 20 in the cover 15. As will be readily understood the mating members of the holder and plate may be varied infinitely. Thus, the cover pertaining to one holder will not be insertible in a holder embodying a different variant of the mating members.

The surface of the indicating plate 14 is roughened by the production of papilla 14ª or the like of a character to prevent the adhesion of paper if it be attempted to paste paper over said plate for concealing the legend.

The present application follows an application filed by me May 8, 1920, Serial Number 379,998, disclosing the generic features of the device forming the subject matter of the present application, said earlier application being pending concurrently herewith.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. As a new article of manufacture, a stop-thief attachment for vehicles including a combined rigid plate and holder therefor, the plate presenting a front adapted to display warning matter, and a cover slidably fitting said holder to conceal said matter, said holder having guide members for the sliding engagement of the cover and presenting a space of irregular form for the latter, said cover having members mating with the irregular form of the holder.

2. As a new article of manufacture, a stop-thief attachment for vehicles including a combined rigid plate and holder therefor, the plate presenting a front adapted to display warning matter, and a cover slidably fitting said holder to conceal said matter, said holder and cover presenting opposed surfaces varying from a straight line transversely of the cover.

3. As a new article of manufacture, a stop-thief attachment for vehicles including a combined rigid plate and holder therefor, the plate presenting a front adapted to display warning matter, and a cover slidably fitting said holder to conceal said matter, said holder having a front and back spaced from each other and presenting corresponding cover-guiding members extending across a straight line transversely of said members, said cover having members to conform to and slidably engage the members on the holder.

4. An attachment of the class described including a holder and an indicating plate supported with the holder; together with a cover for said plate accommodated in said holder, said holder and cover presenting respectively a multiplicity of members slidably interengaging one another, certain of said members on the holder and cover constituting variants of the members to individualize the particular holder and its cover.

5. As a new article of manufacture, a "stop thief" attachment for vehicles, including a holder having a plate adapted to receive display matter and a surface to receive said matter, said surface presenting papilla projecting to an extent to prevent the application and pasting of a covering medium onto the surface.

JOSEPH BILLINGS.